United States Patent
Kang et al.

(10) Patent No.: US 12,361,537 B2
(45) Date of Patent: Jul. 15, 2025

(54) ELECTRONIC DEVICE INCLUDING PROCESSOR EXECUTING DEFECT DETECTION MODULE, OPERATING METHOD OF ELECTRONIC DEVICE, AND METHOD FOR FABRICATING SEMICONDUCTOR INTEGRATED CIRCUIT

(71) Applicant: Samsung Electronics Co., Ltd., Suwon-si (KR)

(72) Inventors: Min-Cheol Kang, Hwaseong-si (KR); Sooryong Lee, Seoul (KR); Kyen-Hee Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 561 days.

(21) Appl. No.: 17/900,334

(22) Filed: Aug. 31, 2022

(65) Prior Publication Data

US 2023/0214990 A1    Jul. 6, 2023

(30) Foreign Application Priority Data

Jan. 6, 2022  (KR) .......................... 10-2022-0002235

(51) Int. Cl.
 G06T 7/00  (2017.01)
 G06T 7/30  (2017.01)
 G06T 11/00  (2006.01)

(52) U.S. Cl.
 CPC ............... G06T 7/001 (2013.01); G06T 7/30 (2017.01); G06T 11/00 (2013.01);
 (Continued)

(58) Field of Classification Search
 CPC . G06T 7/001; G06T 7/30; G06T 11/00; G06T 2207/10061; G06T 2207/20084;
 (Continued)

(56) References Cited

U.S. PATENT DOCUMENTS 7,615,746 B2    11/2009   Nagatomo et al.
9,715,724 B2    7/2017    Schwarzband et al.
(Continued)

FOREIGN PATENT DOCUMENTS

| JP | 2004259339 A | 9/2004 |
|----|--------------|--------|
| JP | 5423286 B2   | 2/2014 |
| JP | 2021052047 A | 4/2021 |

OTHER PUBLICATIONS

Kang et al., "A Novel Method of D2DB Verification Based on Deep Learning and Image Processing Technology," SRD e-Technical Journal, 2021, 2nd Half.

*Primary Examiner* — Hwa Andrew Lee
(74) *Attorney, Agent, or Firm* — Muir Patent Law, PLLC

(57) ABSTRACT

Disclosed is a semiconductor integrated circuit fabricating method of a semiconductor fabricating device which includes a processor executing a defect detection module includes receiving, at the defect detection module, a first capture image of the semiconductor integrated circuit and a first layout image, generating, at the defect detection module, a second layout image from the first capture image, generating, at the defect detection module, a contour image from the first capture image and the second layout image, detecting, at the defect detection module, a defect of the semiconductor integrated circuit based on the first layout image and the contour image, analyzing, at the semiconductor fabricating device, a correlation between a kind of the defect and process variations of the semiconductor integrated circuit, and changing, at the semiconductor fabricating device, at least one process variation having a correlation with the defect from among the process variations.

20 Claims, 11 Drawing Sheets

(52) U.S. Cl.
CPC ............. *G06T 2207/10061* (2013.01); *G06T 2207/20084* (2013.01); *G06T 2207/30148* (2013.01)

(58) Field of Classification Search
CPC ......... G06T 2207/30148; G06T 7/0004; G06T 3/40; G06T 7/13; H01L 22/12
See application file for complete search history.

(56) References Cited

U.S. PATENT DOCUMENTS

| | | |
|---|---|---|
| 10,529,534 B2 | 1/2020 | Sriraman |
| 2013/0174102 A1* | 7/2013 | Leu ................. G05B 19/41875 716/52 |
| 2018/0218492 A1* | 8/2018 | Zhang ................... G06T 7/0006 |
| 2020/0211178 A1 | 7/2020 | Zhou et al. |

* cited by examiner

ELECTRONIC DEVICE INCLUDING PROCESSOR EXECUTING DEFECT DETECTION MODULE, OPERATING METHOD OF ELECTRONIC DEVICE, AND METHOD FOR FABRICATING SEMICONDUCTOR INTEGRATED CIRCUIT

CROSS-REFERENCE TO RELATED APPLICATIONS

This application claims priority under 35 U.S.C. § 119 to Korean Patent Application No. 10-2022-0002235 filed on Jan. 6, 2022, in the Korean Intellectual Property Office, the disclosure of which is incorporated by reference herein in its entirety.

BACKGROUND

Embodiments of the present disclosure described herein relate to an electronic device, and more particularly, relate to an electronic device including a processor executing a defect detection module detecting a defect on a semiconductor integrated circuit, an operating method of the electronic device, and a method for fabricating a semiconductor integrated circuit.

A semiconductor integrated circuit is implemented by forming various circuit patterns on a silicon wafer. As a semiconductor fabricating technology develops, the degree of integration of circuit patterns of a semiconductor integrated circuit may increase, and the line width (or minimum feature size) may decrease. Accordingly, defects that occur in the process of fabricating a semiconductor integrated circuit are increasing in kind and amount.

A scanning electron microscope (SEM) image of a semiconductor integrated circuit may be captured to detect defects of the semiconductor integrated circuit. The defects of the semiconductor integrated circuit may be detected by using the captured SEM image. However, as the degree of integration of the semiconductor integrated circuit consistently increases and the line width consistently decreases, costs and a time necessary to detect defects from the captured SEM image are consistently increasing.

SUMMARY

Embodiments of the present disclosure provide an electronic device including a processor executing a defect detection module detecting a defect on a semiconductor integrated circuit with a shortened time and improved accuracy, an operating method of the electronic device, and a method for fabricating a semiconductor integrated circuit.

According to an embodiment, a semiconductor integrated circuit fabricating method of a semiconductor fabricating device which includes a processor executing a defect detection module includes receiving, at the defect detection module, a first capture image of the semiconductor integrated circuit and a first layout image, generating, at the defect detection module, a second layout image from the first capture image, generating, at the defect detection module, a contour image from the first capture image and the second layout image, detecting, at the defect detection module, a defect of the semiconductor integrated circuit based on the first layout image and the contour image, analyzing, at the semiconductor fabricating device, a correlation between a kind of the defect and process variations of the semiconductor integrated circuit, and changing, at the semiconductor fabricating device, at least one process variation having a correlation with the defect from among the process variations.

According to an embodiment, an electronic device includes a memory that stores a first capture image and a second capture image of a semiconductor integrated circuit, and a processor that executes a defect detection module. The defect detection module, when executed by the processor, receives the first capture image and a first layout image, generates a second layout image from the first capture image, generates a contour image from the first capture image and the second layout image, and detects a defect based on the first layout image and the contour image. The first capture image is an image captured from a semiconductor integrated circuit fabricated based on the first layout image and the first capture image includes a defect in the semiconductor integrated circuit.

According to an embodiment, an operating method of an electronic device which includes a processor executing a defect detection module includes receiving, at the defect detection module, a first capture image of a semiconductor integrated circuit, a second capture image, and a first layout image, generating, at the defect detection module, a second layout image and a third layout image from the first capture image and the second capture image, respectively, comparing, at the defect detection module, the second layout image and the first layout image to detect an alignment parameter, generating, at the defect detection module, a contour image from the second capture image and the third layout image, aligning, at the defect detection module, the contour image with the first layout image based on the alignment parameter, and detecting, at the defect detection module, a difference between the contour image and the first layout image as a defect.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that one of ordinary skill in the art may implement the present disclosure. Below, the term "and/or" is interpreted as including any one of items listed with regard to the term, or a combination of some of the listed items.

Figure 1:
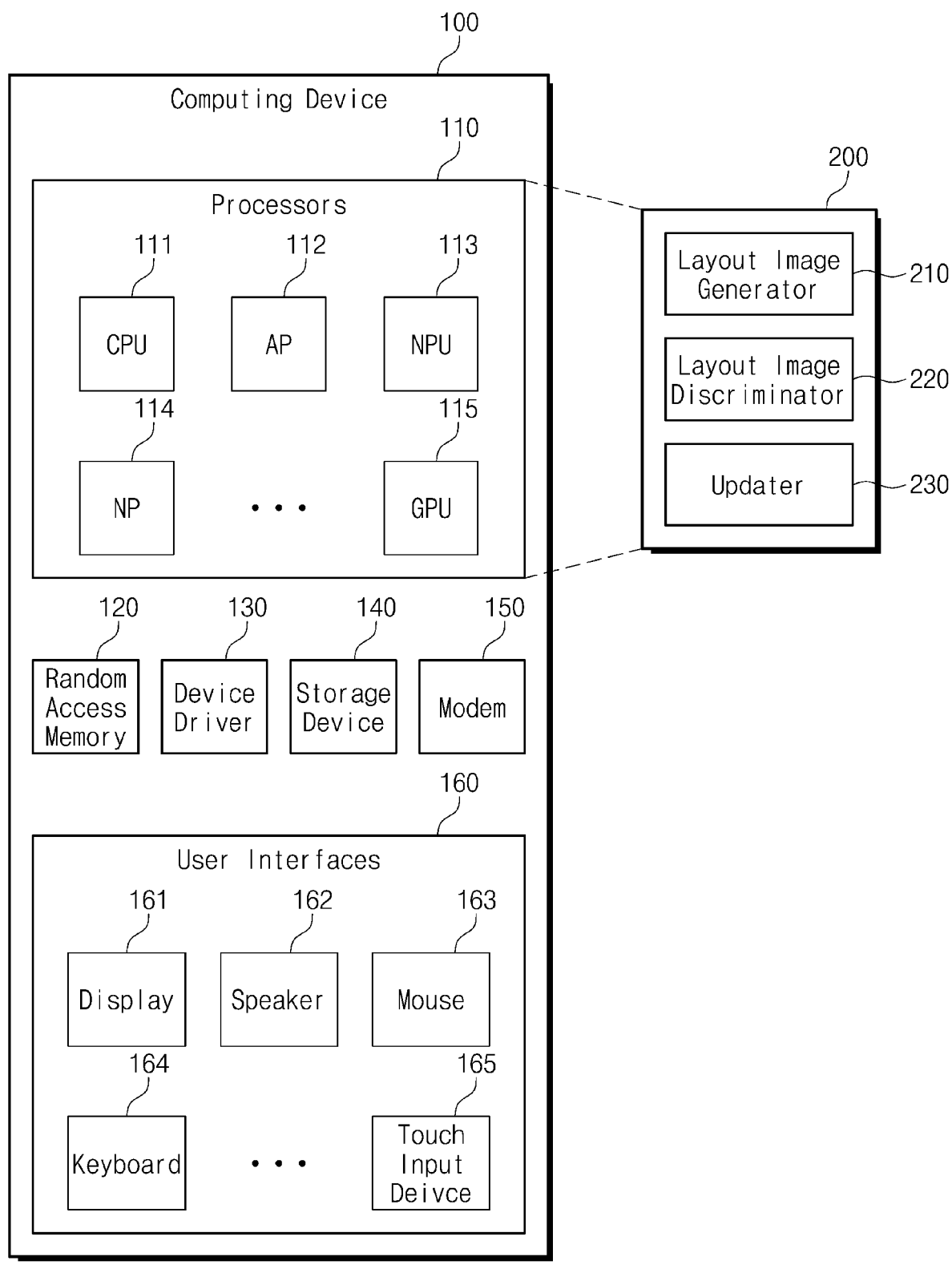
FIG. 1 is a block diagram illustrating an electronic device according to an embodiment of the present disclosure.

FIG. 1 is a block diagram illustrating an electronic device 100 according to an embodiment of the present disclosure. Referring to FIG. 1, the electronic device 100 may include processors 110, a random access memory 120, a device driver 130, a storage device 140, a modem 150, and user interfaces 160.

The processors 110 may include, for example, at least one general-purpose processor such as a central processing unit (CPU) 111 or an application processor (AP) 112. Also, the processors 110 may further include at least one special-purpose processor such as a neural processing unit (NPU) 113, a neuromorphic processor 114, or a graphics processing unit (GPU) 115. The processors 110 may include two or more homogeneous processors.

At least one of the processors 110 may drive an image generation learning module 200. For example, the image generation learning module 200 may be implemented in the form of instructions (or codes) that are executed by at least one of the processors 110. In this case, the at least one processor may load the commands (or codes) of the image generation learning module 200 onto the random access memory 120.

For another example, at least one (or at least another) processor of the processors 110 may be fabricated to implement the image generation learning module 200. For example, at least one processor may be a dedicated processor that implements functions of the image generation learning module 200 in hardware.

The random access memory 120 may be used as a working memory of the processors 110 and may be used as a main memory or a system memory of the electronic device 100. The random access memory 120 may include a volatile memory such as a dynamic random access memory or a static random access memory, or a nonvolatile memory such as a phase-change random access memory, a ferroelectric random access memory, a magnetic random access memory, or a resistive random access memory.

The random access memory 120 may store images that are used for the learning of the image generation learning module 200. For example, the random access memory 120 may receive images from the storage device 140 or may receive images from an external device (e.g., a database) through the modem 150.

The device driver 130 may control the following peripheral devices depending on a request of the processors 110: the storage device 140, the modem 150, and the user interfaces 160. The storage device 140 may include a stationary storage device such as a hard disk drive or a solid state drive, or a removable storage device such as an external hard disk drive, an external solid state drive, or a removable memory card.

The storage device 140 may store images that are used for the learning of the image generation learning module 200. The images stored in the storage device 140 may be loaded onto the random access memory 120 and may be used for the learning of the image generation learning module 200.

The modem 150 may provide remote communication with an external device. The modem 150 may perform wired or wireless communication with the external device. The modem 150 may communicate with the external device based on at least one of various communication schemes such as Ethernet, wireless-fidelity (Wi-Fi), long term evolution (LTE), and 5G mobile communication. The modem 150 may receive images, which are used for the learning of the image generation learning module 200, from the external device, for example, the database. The modem 150 may load the received images onto the random access memory 120.

The user interfaces 160 may receive information from a user and may provide information to the user. The user interfaces 160 may include at least one user output interface such as a display 161 or a speaker 162, and at least one user input interface such as a mouse 163, a keyboard 164, or a touch input device 165.

The commands (or codes) of the image generation learning module 200 may be received through the modem 150 and may be stored in the storage device 140. The commands (or codes) of the image generation learning module 200 may be stored in a removable storage device, and the removable storage device may be connected with the electronic device 100. The commands (or codes) of the image generation learning module 200 may be loaded and executed onto the random access memory 120 from the storage device 140.

The image generation learning module 200 may include a layout image generator 210, a layout image discriminator 220, and an updater 230. The layout image generator 210 may be trained to generate a layout image of a semiconductor integrated circuit from a capture image, for example, a scanning electron microscope (SEM) image obtained by photographing the semiconductor integrated circuit. The semiconductor integrated circuit may be a part of a semiconductor device, such as a memory chip or a logic chip.

The layout image discriminator 220 may be trained to determine or discriminate which of the layout image of the semiconductor integrated circuit and a layout image generated by the layout image generator 210 is true and which thereof is false. The updater 230 may train the layout image generator 210 and the layout image discriminator 220 depending on a discrimination result of the layout image discriminator 220.

In an embodiment, the layout image generator 210, the layout image discriminator 220, and the updater 230 may be trained based on a generative adversarial network (GAN) or a conditional GAN (CGAN). In an embodiment, the layout image generator 210, the layout image discriminator 220, and the updater 230 may perform learning based on the images stored in the random access memory 120.

Figure 2:
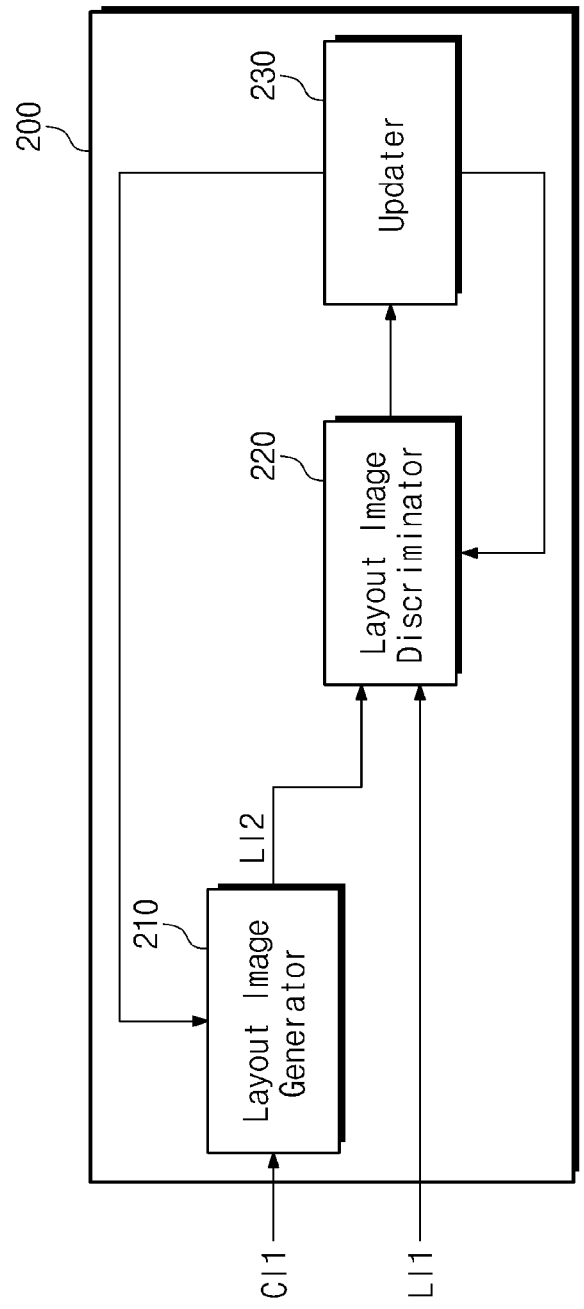
FIG. 2 illustrates an example of an image generation learning module in detail.

FIG. 2 illustrates an example of the image generation learning module 200 in detail. Referring to FIGS. 1 and 2, the image generation learning module 200 may receive a first capture image CD and a first layout image LI1 from the random access memory 120.

The first layout image LI1 may refer to a CAD drawing for fabrication of a semiconductor integrated circuit. For example, the first layout image LI1 may be a portion cropped from an original layout image. The layout image may include target patterns to be formed on a semiconductor wafer, for example, semiconductor patterns, conductor patterns, or insulator patterns, layers, and other components. The layout image represents the target patterns in terms of planar geometric shapes and may conform to design rules imposing geometric constraints.

The first capture image CI1 may refer to an image (e.g., a SEM image) captured from a semiconductor integrated circuit implemented without defects based on the first layout image LI1. For example, the first capture image CD may refer to a portion cropped from an image captured from a semiconductor integrated circuit implemented without defects based on the first layout image LI1, for example, a portion corresponding to the first layout image LI1.

The layout image generator 210 may generate a second layout image LI2 from the first capture image CI1. For example, the layout image generator 210 may generate the second layout image LI2 from the first capture image CI1 by using internal parameters.

The layout image discriminator 220 may receive the first layout image LI1 and the second layout image LI2. The layout image discriminator 220 may determine or discriminate which of the first layout image LI1 and the second layout image LI2 is a true layout image and which thereof is a false layout image. For example, by using the internal parameters, the layout image discriminator 220 may determine or discriminate which of the first layout image LI1 and the second layout image LI2 is a true layout image and which thereof is a false layout image.

The updater 230 may receive a discrimination result of the layout image discriminator 220. The updater 230 may train the layout image generator 210 and the layout image discriminator 220 sequentially or simultaneously, based on the discrimination result. For example, the updater 230 may train the layout image generator 210 by updating internal parameters of the layout image generator 210. The updater 230 may train the layout image discriminator 220 by updating internal parameters of the layout image discriminator 220.

Figure 3:
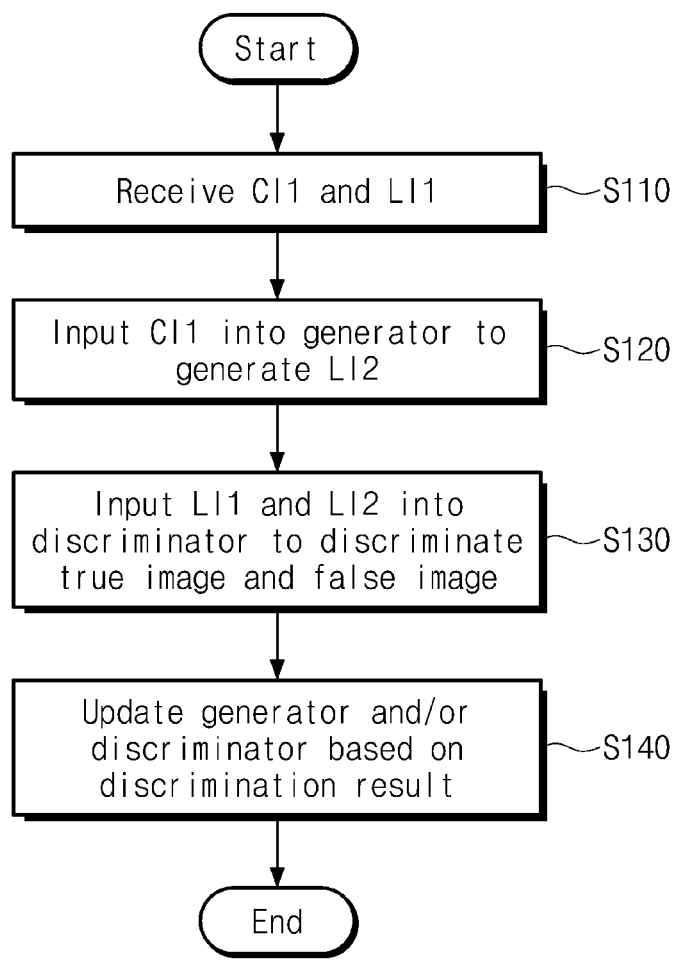
FIG. 3 illustrates an operating method of an image generation learning module executed by processors.

FIG. 3 illustrates an operating method of the image generation learning module 200 executed by the processors 110. Referring to FIGS. 1, 2, and 3, in operation S110, the processors 110 may receive the first capture image CI1 and the first layout image LI1. For example, the processors 110 may receive the first capture image CD and the first layout image LI1 from the random access memory 120.

In operation S120, the processors 110 may input the first capture image CD into the layout image generator 210 of the image generation learning module 200 and may generate the second layout image LI2.

In operation S130, the processors 110 may input the first layout image LI1 and the second layout image LI2 into the layout image discriminator 220 of the image generation learning module 200 and may discriminate between a true image and a false image.

In operation S140, the processors 110 may execute the updater 230 of the image generation learning module 200 such that the layout image generator 210 and/or the layout image discriminator 220 is updated based on a discrimination result.

In an embodiment, the processors 110 of the electronic device 100 may repeatedly train the image generation learning module 200 by using pairs of layout images and capture images. The processors 110 of the electronic device 100 may collect discrimination results that are based on a given number of pairs of images and may update the internal parameters of the layout image generator 210 and the layout image discriminator 220 based on the collected discrimination results.

As the degree of integration of a semiconductor integrated circuit increases and the line width decreases, it may be impossible to detect defects from an original layout image for a semiconductor integrated circuit and the whole capture image of a semiconductor integrated circuit implemented based on the original layout image. Accordingly, defects of a semiconductor integrated circuit may be detected based on a layout image cropped from an original layout image and a capture image cropped from an original capture image.

According to the above defect detection process, the first layout image LI1 that is used for the image generation learning module 200 to perform machine learning may be an image cropped from an original layout image. Also, the first capture image CI1 that is used for the image generation learning module 200 to perform machine learning may be a portion of an original capture image, which is cropped at a location corresponding to the first layout image LI1.

Figure 4:
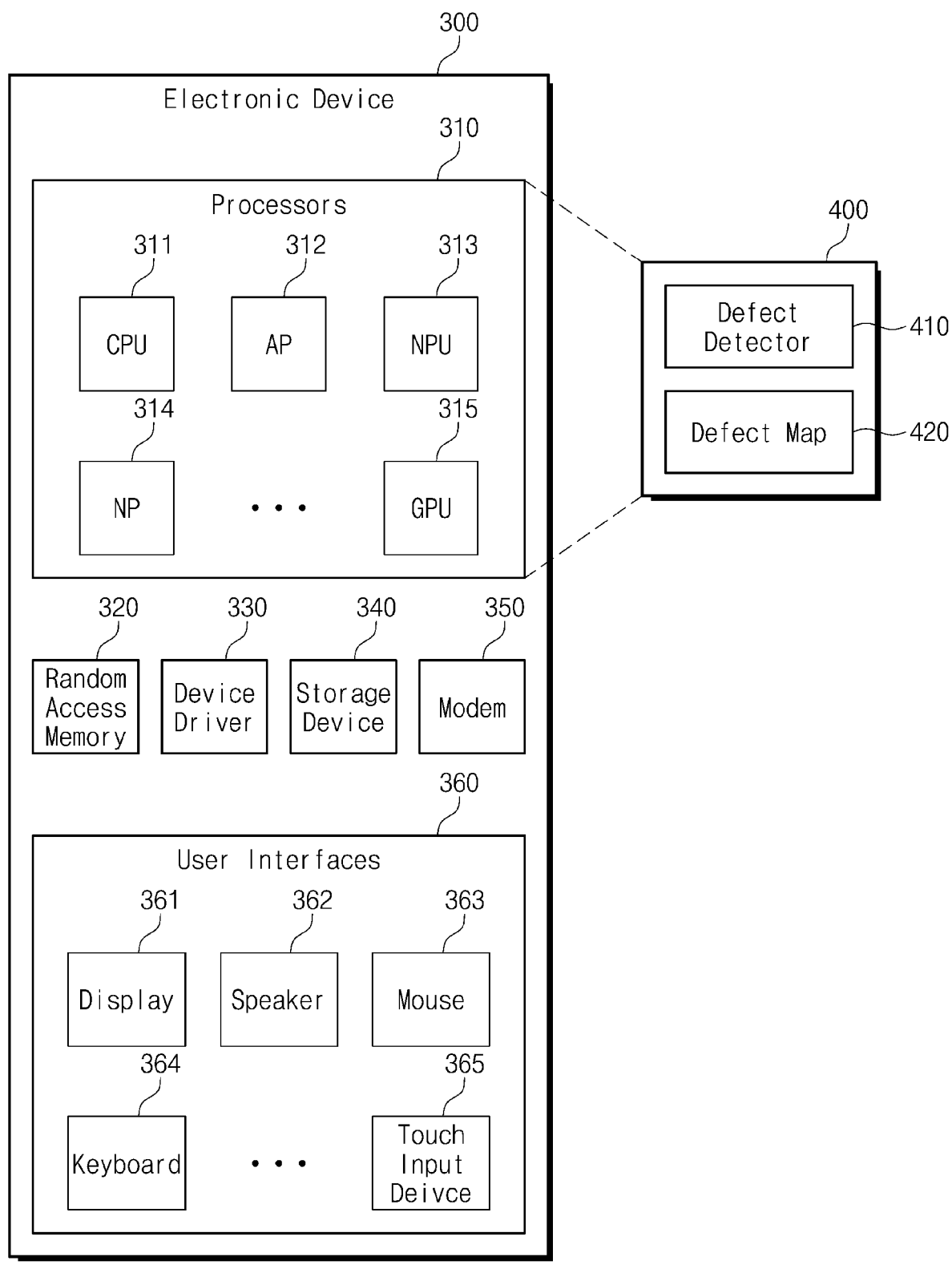
FIG. 4 is a block diagram illustrating an electronic device according to an embodiment of the present disclosure.

FIG. 4 is a block diagram illustrating an electronic device 300 according to an embodiment of the present disclosure. Referring to FIG. 4, the electronic device 300 may include processors 310, a random access memory 320, a device driver 330, a storage device 340, a modem 350, and user interfaces 360.

The processors 310 may include, for example, at least one general-purpose processor such as a central processing unit (CPU) 311 or an application processor (AP) 312. Also, the processors 310 may further include at least one special-purpose processor such as a neural processing unit (NPU) 313, a neuromorphic processor 314, or a graphics processing unit (GPU) 315. The processors 310 may include two or more homogeneous processors.

At least one of the processors 310 may drive a defect detection module 400. For example, the defect detection module 400 may be implemented in the form of commands (or code) that are executed by at least one of the processors 310. In this case, the at least one processor may load the commands (or code) of the defect detection module 400 onto the random access memory 320.

For another example, at least one (or at least another) processor of the processors 310 may be manufactured to implement the defect detection module 400. For example, at least one processor may be a dedicated processor that implements functions of the defect detection module 400 in hardware.

The random access memory 320 may be used as a working memory of the processors 310 and may be used as a main memory or a system memory of the electronic device 300. The random access memory 320 may include a volatile memory such as a dynamic random access memory or a static random access memory or a nonvolatile memory such as a phase-change random access memory, a ferroelectric random access memory, a magnetic random access memory, or a resistive random access memory.

The random access memory 320 may store images necessary for the defect detection module 400 to detect a defect of a semiconductor integrated circuit. For example, the random access memory 320 may receive images from the storage device 340 or may receive images from an external device (e.g., a database) through the modem 350.

The device driver 330 may control the following peripheral devices depending on a request of the processors 310: the storage device 340, the modem 350, and the user interfaces 360. The storage device 340 may include a stationary storage device such as a hard disk drive or a solid state drive, or a removable storage device such as an external hard disk drive, an external solid state drive, or a removable memory card.

The storage device 340 may store images necessary for the defect detection module 400 to detect a defect of a semiconductor integrated circuit. The images stored in the storage device 340 may be loaded onto the random access memory 320 and may be used for learning of the defect detection module 400.

The modem 350 may provide remote communication with an external device. The modem 350 may perform wired or wireless communication with the external device. The modem 350 may communicate with the external device based on at least one of various communication schemes such as Ethernet, wireless-fidelity (Wi-Fi), long term evolution (LTE), and 5G mobile communication. The modem 350 may receive images, which are necessary for the defect detection module 400 to detect a defect of a semiconductor integrated circuit, from the external device, for example, the database. The modem 350 may load the received images onto the random access memory 320.

The user interfaces 360 may receive information from a user and may provide information to the user. The user interfaces 360 may include at least one user output interface such as a display 361 or a speaker 362, and at least one user input interface such as a mouse 363, a keyboard 364, or a touch input device 365.

The commands (or code) of the defect detection module 400 may be received through the modem 350 and may be stored in the storage device 340. The commands (or code) of the defect detection module 400 may be stored in a removable storage device, and the removable storage device may be connected with the electronic device 300. The commands (or code) of the defect detection module 400 may be loaded and executed onto the random access memory 320 from the storage device 340.

The defect detection module 400 may include a defect detector 410 and a defect map 420. The defect detector 410 may detect a defect(s) based on images of a semiconductor integrated circuit transferred from the random access memory 320. The defect detector 410 may mark a location(s) of a defect(s) on the defect map 420. The defect map 420 may refer to data stored in storage in the processors 310, such as a memory, a register, a stack, or a cache. Alternatively, the defect map 420 may be stored in the random access memory 320 and may be accessed by the processors 310.

Figure 5:
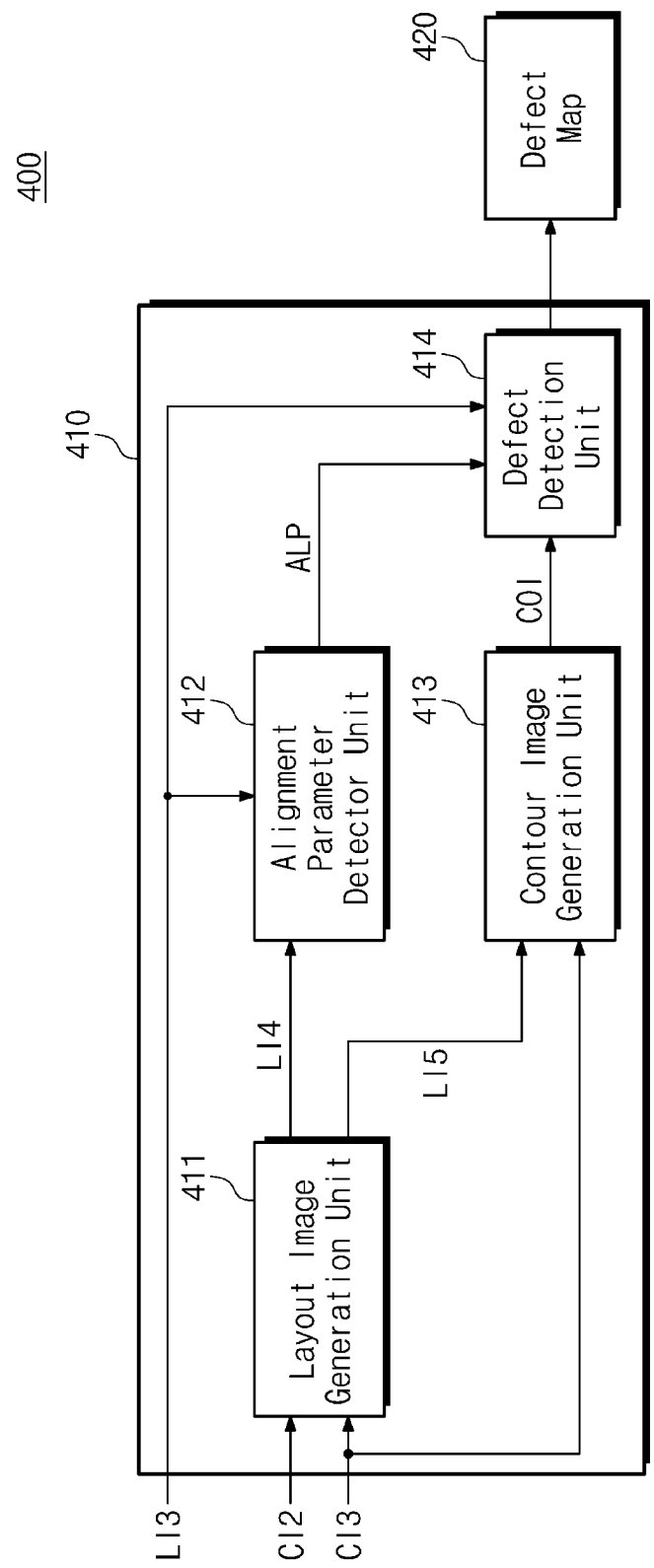
FIG. 5 illustrates a defect detection module according to an embodiment of the present disclosure.

FIG. 5 illustrates the defect detection module 400 according to an embodiment of the present disclosure. Referring to FIGS. 4 and 5, the defect detection module 400 may include the defect detector 410 and the defect map 420. The defect detector 410 may receive a third layout image LI3, a second capture image CI2, and a third capture image CI3.

For example, the third layout image LI3 may refer to a CAD drawing for fabrication of a semiconductor integrated circuit. For example, the third layout image LI3 may be a portion cropped from an original layout image.

The second capture image CI2 may refer to an image (e.g., a SEM image) captured from a semiconductor integrated circuit implemented without defects based on the third layout image LI3. For example, the second capture image CI2 may refer to a portion cropped from an image captured from a semiconductor integrated circuit implemented without defects based on the third layout image LI3, for example, a portion corresponding to the third layout image LI3.

The third capture image CI3 may refer to an image captured from a semiconductor integrated circuit implemented with defects based on the third layout image LI3, for example, a SEM image. Alternatively, the third capture image CI3 may refer to an image that is captured from a semiconductor integrated circuit implemented based on the third layout image LI3 and is provided for defect detection, for example, a SEM image. For example, the third capture image CI3 may refer to a portion cropped from an image captured from a semiconductor integrated circuit implemented based on the third layout image LI3, for example, a portion corresponding to the third layout image LI3. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

The defect detector 410 may detect a defect(s) from the third capture image CI3 based on the second capture image CI2, the third capture image CI3, and the third layout image LI3. The defect detector 410 may mark the detected defect on the defect map 420.

The defect detector 410 may include a layout image generation unit 411, an alignment parameter detector unit 412, a contour image generation unit 413, and a defect detection unit 414.

The layout image generation unit 411 may receive the second capture image CI2 and the third capture image CI3. The layout image generation unit 411 may generate a fourth layout image LI4 and a fifth layout image LI5 from the second capture image CI2 and the third capture image CI3, respectively. The layout image generation unit 411 may include the layout image generator 210 trained by the processors 110 of the electronic device 100 based on the GAN or CGAN, which is described with reference to FIGS. 1 to 3.

The layout image generation unit 411 may sequentially or simultaneously perform an operation of generating the fourth layout image LI4 from the second capture image CI2 and an operation of generating the fifth layout image LI5 from the third capture image CI3.

The alignment parameter detector unit 412 may receive the third layout image LI3 and the fourth layout image LI4. The alignment parameter detector unit 412 may detect a misalignment degree (e.g., a shifted degree) of the third layout image LI3 and the fourth layout image LI4 as an alignment parameter ALP.

The third layout image LI3 may refer to an image cropped from an original layout image. The fourth layout image LI4 may refer to an image generated by the layout image generation unit 411 from the second capture image CI2 that is cropped from an original capture image captured from a semiconductor integrated circuit fabricated based on the original layout image.

That is, when a layout image is generated from a layout image generated from an original capture image by using the layout image generation unit 411, the alignment parameter detector unit 412 may detect, as the alignment parameter ALP, alignment information between the generated layout image and the original layout image (e.g., a misalignment degree or a shifted degree on the coordinate system including at least two vertical vectors).

For example, the alignment parameter detector unit 412 may detect a difference between a location of the center of the third layout image LI3 and a location of the center of the fourth layout image LI4 as the alignment parameter ALP.

The contour image generation unit 413 may receive the fifth layout image LI5 and the third capture image CI3. The contour image generation unit 413 may generate a contour image COI of the third capture image CI3 based on the fifth layout image LI5 and the third capture image CI3.

For example, the contour image generation unit 413 may invert or maintain the fifth layout image LI5 for the purpose of matching a tone of the fifth layout image LI5 with a tone of the third capture image CI3. Afterwards, the contour image generation unit 413 may perform blurring on the fifth layout image LI5 (or the inverted fifth layout image LI5). Boundary lines in the blurred layout image may be blurred.

The contour image generation unit 413 may perform blending (e.g., alpha blending) on the blurred layout image and the third capture image CI3. When the blending is completed, the blurred layout image may fill the inside of a pattern of the third capture image CI3 or the inside of a space of the third capture image CI3.

The contour image generation unit 413 may remove noise by performing low pass filtering or median filtering on the blended image. When a defect, for example, a pattern including a fine disconnection at a specific location (e.g., a disconnection of a very small size or width) exists, the corresponding portion including the defect may appear to be blurred in the third capture image CI3. Also, the corresponding portion may appear to be blurred in the fifth layout image LI5, and the unclearness may be further intensified by the blurring.

When the blending is performed, the unclearness of the corresponding portion may be intensified or may be at least maintained. When the low pass filtering or median filtering is performed on the blended image, the corresponding portion may be regarded as a noise or may be removed. That is, a portion where a defect occurs may be clearly shown. That is, the contour image generation unit 413 may generate the contour image COI clearly showing a defect(s).

The defect detection unit 414 may receive the third layout image LI3, the alignment parameter ALP, and the contour image COI. The defect detection unit 414 may detect a defect(s) based on the third layout image LI3, the alignment parameter ALP, and the contour image COI.

For example, the defect detection unit 414 may shift (e.g., the center of) the contour image COI as much as the alignment parameter ALP and may align the shifted contour image with the third layout image LI3. When the alignment parameter ALP is applied, an alignment error that occurs by the layout image generation unit 411 may be compensated for.

The defect detection unit 414 may detect a difference(s) between the aligned contour image COI and the third layout image LI3 as a defect(s). The defect detection unit 414 may mark the detected defect(s) on the defect map 420.

Figure 6:
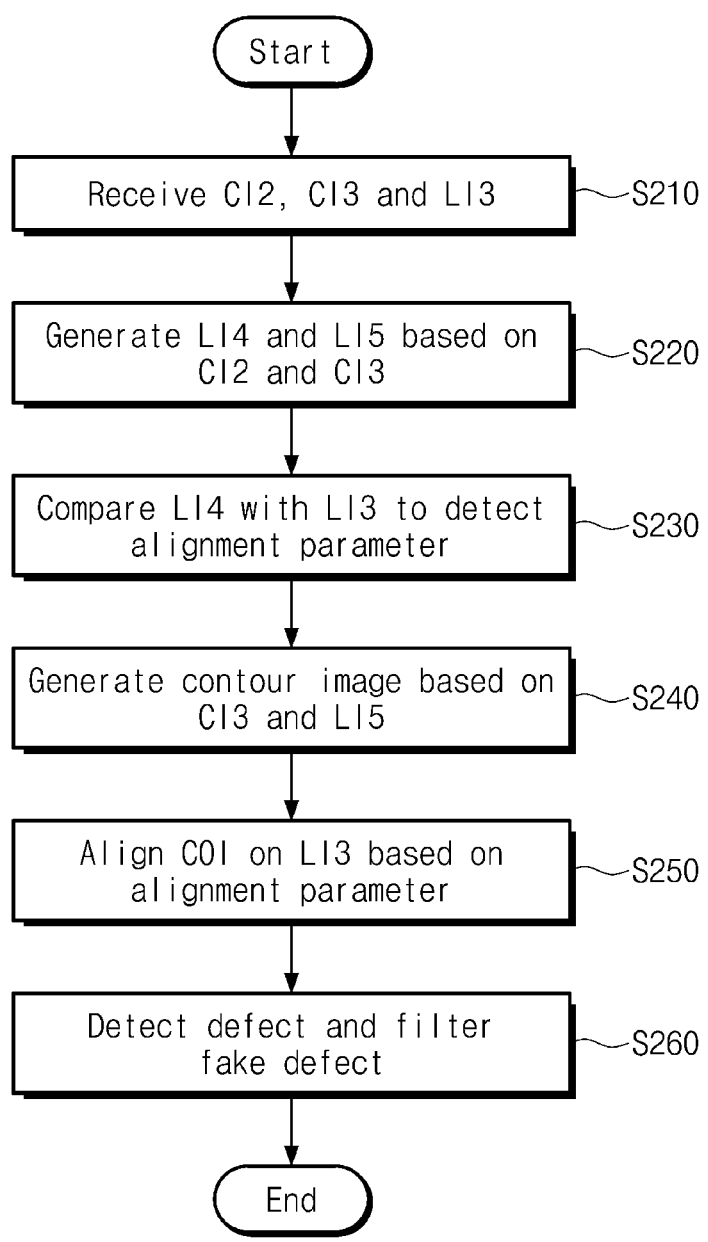
FIG. 6 illustrates an example of an operating method of an electronic device according to an embodiment of the present disclosure.

FIG. 6 illustrates an example of an operating method of the electronic device 300 according to an embodiment of the present disclosure. Referring to FIGS. 4, 5, and 6, in operation S210, the processors 310 of the electronic device 300 may receive the second capture image CI2, the third capture image CI3, and the third layout image LI3. For example, the processors 310 may receive the second capture image CI2, the third capture image CI3, and the third layout image LI3 from the random access memory 320.

In operation S220, the processors 310 may execute the layout image generation unit 411 of the defect detector 410 in the defect detection module 400 and may generate the fourth layout image LI4 and the fifth layout image LI5 based on the second capture image CI2 and the third capture image CI3, respectively.

In operation S230, the processors 310 may execute the alignment parameter detector unit 412 of the defect detector 410 in the defect detection module 400 and may detect the alignment parameter ALP by comparing the fourth layout image LI4 and the third layout image LI3. That is, the alignment parameter detector unit 412 may detect an alignment error that occurs by the layout image generation unit 411.

In operation S240, the processors 310 may execute the contour image generation unit 413 of the defect detector 410 in the defect detection module 400 and may generate the contour image COI based on the third capture image CI3 and the fifth layout image LI5. For example, the contour image generation unit 413 may perform blurring on the fifth layout image LI5, may blend the blurred fifth layout image LI5 and the third capture image CI3, and may generate a contour image by performing filtering on the blended image.

In operation S250, the processors 310 may execute the defect detection unit 414 of the defect detector 410 in the defect detection module 400 and may align the contour image COI with the third layout image LI3 based on the alignment parameter ALP. For example, the defect detector 410 may align the contour image COI with the third layout image LI3 by matching the center of the contour image with the center of the third layout image LI3 and shifting the center of the contour image COI as much as the alignment parameter ALP.

In operation S260, the processors 310 may execute the defect detection unit 414 of the defect detector 410 in the defect detection module 400 and may detect a different location(s) between the aligned contour image COI and the third layout image LI3 as a defect(s) of the third capture image CI3. In an embodiment, the defect detection unit 414 may filter and remove a defect(s), which is regarded as a false defect or a fake detect (i.e., not an actual defect), from among the detected defects.

Figure 7:
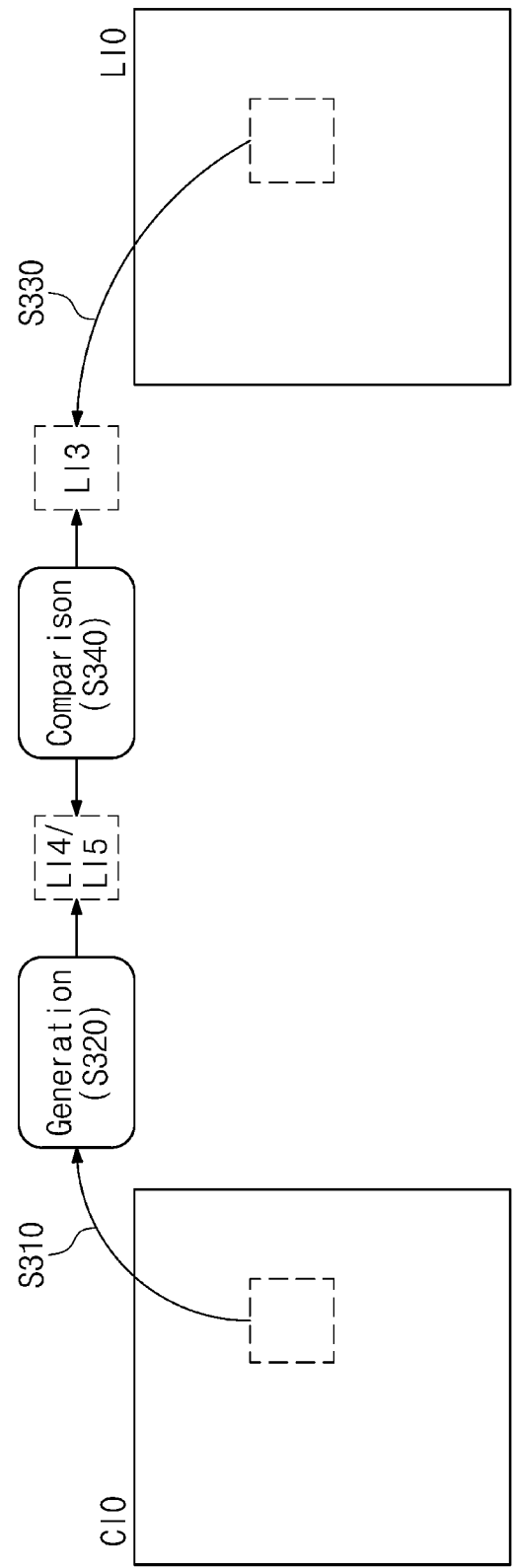
FIG. 7 illustrates an example in which an original capture image and an original layout image are cropped and compared.

FIG. 7 illustrates an example in which an original capture image CI0 and an original layout image LI0 are cropped and compared. Referring to FIGS. 5 and 7, the original capture image CI0 may be an original image of the second capture image CI2 or the third capture image CI3. In operation S310, a portion of the original capture image CI0 may be cropped as the second capture image CI2 or the third capture image CI3.

In operation S320, the layout image generation unit 411 of the defect detector 410 in the defect detection module 400 may generate the fourth layout image LI4 or the fifth layout image LI5 based on the second capture image CI2 or the third capture image CI3.

In operation S330, a portion of the original layout image LI0 may be cropped as the third layout image LI3. A location of the original layout image LI0, at which the third layout image LI3 is cropped, may be the same as a location of the original capture image CI0 at which the second capture image CI2 or the third capture image CI3 is cropped.

In operation S340, the alignment parameter detector unit 412 of the defect detector 410 in the defect detection module 400 may detect the alignment parameter ALP by comparing the fourth layout image LI4 and the third layout image LI3. The defect detection unit 414 of the defect detector 410 in the defect detection module 400 may also detect a defect(s) by comparing the fifth layout image LI5 and the third layout image LI3.

The process described with reference to FIG. 7 may be sequentially performed on the whole region of the original capture image CI0 and on the whole region of the original layout image LI0. Accordingly, locations of defects of the third capture images CI3 may be completely detected.

Figure 8:
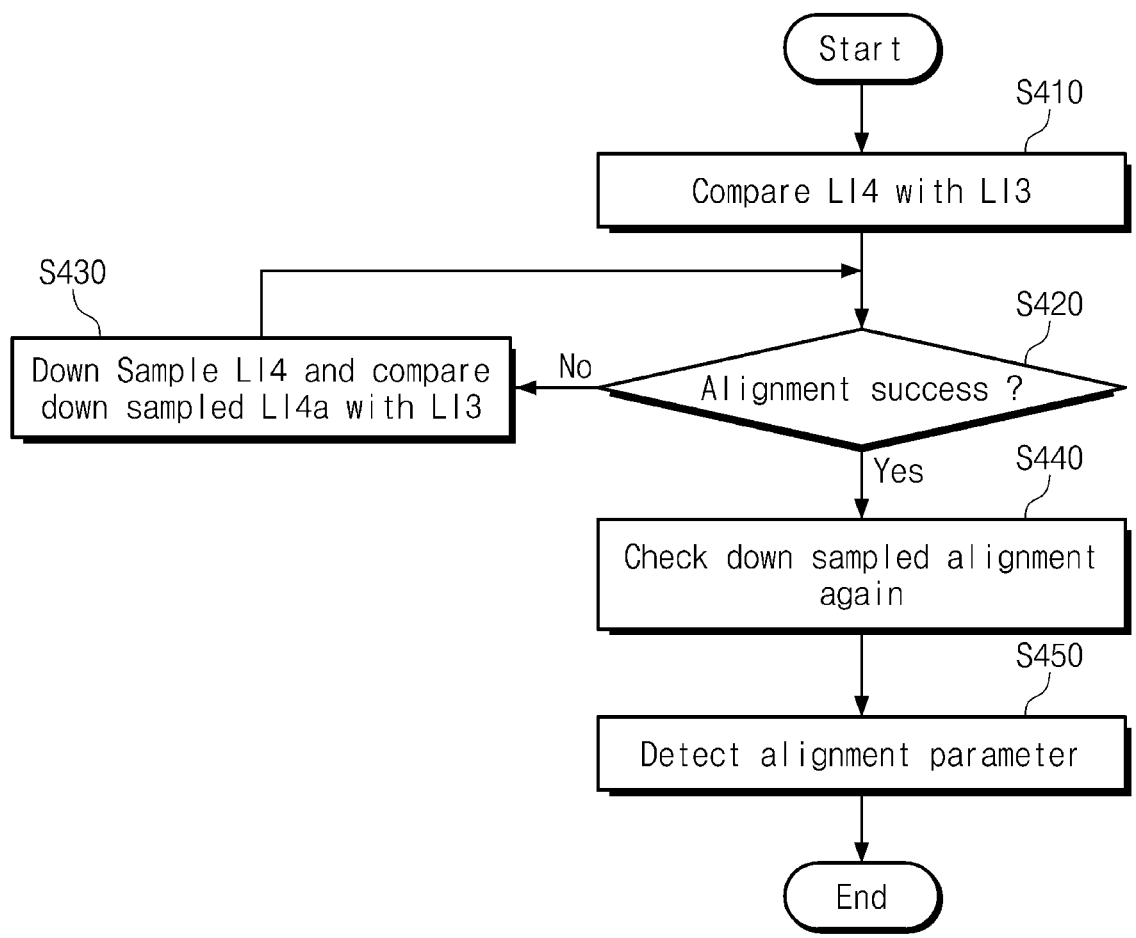
FIG. 8 illustrates an example of a process in which an alignment parameter detector unit repeatedly compares a fourth layout image and a third layout image.

FIG. 8 illustrates an example of a process in which the alignment parameter detector unit 412 repeatedly compares the fourth layout image LI4 and the third layout image LI3. Referring to FIGS. 5 and 8, in operation S410, the alignment parameter detector unit 412 of the defect detector 410 in the defect detection module 400 may compare the fourth layout image LI4 with the third layout image LI3.

In operation S420, the alignment parameter detector unit 412 may determine whether the alignment succeeds. For example, the alignment parameter detector unit 412 may calculate an alignment score depending on the degree to which the fourth layout image LI4 and the third layout image LI3 coincide with each other. For example, the degree to which two layout images coincide with each other may specifically reflect a shift amount, or may generally reflect a magnitude of a particular difference or group of differences between the images, and/or a number of differences between the images. As the degree of coincidence becomes higher, the alignment score may increase; as the degree of coincidence becomes lower, the alignment score may decrease. When the alignment score is lower than a first threshold value, the alignment parameter detector unit 412 may determine that the alignment fails.

When the alignment fails, in operation S430, the alignment parameter detector unit 412 may down-sample the fourth layout image LI4 such that a resolution decreases or a size is reduced. For example, the alignment parameter detector unit 412 may decrease the sharpness of the fourth layout image LI4 such that the alignment score with the third layout image LI3 increases. Afterwards, the alignment parameter detector unit 412 may compare a down-sampled layout image LI4*a* and the third layout image LI3.

In an embodiment, the alignment parameter detector unit 412 may select (e.g., crop) a sixth layout image, which includes the third layout image LI3 and is wider in region than the third layout image LI3, from an original layout image (e.g., LI0) (refer to FIG. 7) of the third layout image LI3. The alignment parameter detector unit 412 may compare the down-sampled layout image LI4*a* and the sixth layout image. Afterwards, operation S420 is performed.

When it is determined in operation S420 that the alignment succeeds, in operation S440, the alignment parameter detector unit 412 may again check the down-sampled alignment. For example, at a location where the down-sampled layout image LI4*a* is aligned with the third layout image LI3 or the sixth layout image, the alignment parameter detector unit 412 may again check the alignment of the third layout image LI3 and the fourth layout image LI4 not down-sampled.

In operation S450, the alignment parameter detector unit 412 may detect the alignment parameter ALP. For example, the alignment parameter detector unit 412 may detect a shift between the center of the fourth layout image LI4 and the center of the third layout image LI3 as the alignment parameter ALP.

In an embodiment, the alignment parameter detector unit 412 may again check the alignment score in operation S440. When the alignment score is greater than or equal to a second threshold value (e.g., equal to or different from the first threshold value), the alignment parameter detector unit 412 may again perform operation S430 after increasing a down-sampling level of the fourth layout image LI4 and/or enlarging the size of the sixth layout image.

Alternatively, when the alignment score is greater than or equal to the second threshold value (e.g., equal to or different from the first threshold value), the alignment parameter detector unit 412 may perform operation S450. When the alignment score is smaller than the second threshold value, the alignment parameter detector unit 412 may generate a signal providing notification that the detection of the alignment parameter ALP is impossible. The process of detecting a defect may be terminated in response to the generated signal.

In an embodiment, in the case where down-sampling is not performed in the process of detecting the alignment parameter ALP, operation S440 may be omitted.

Figure 9:
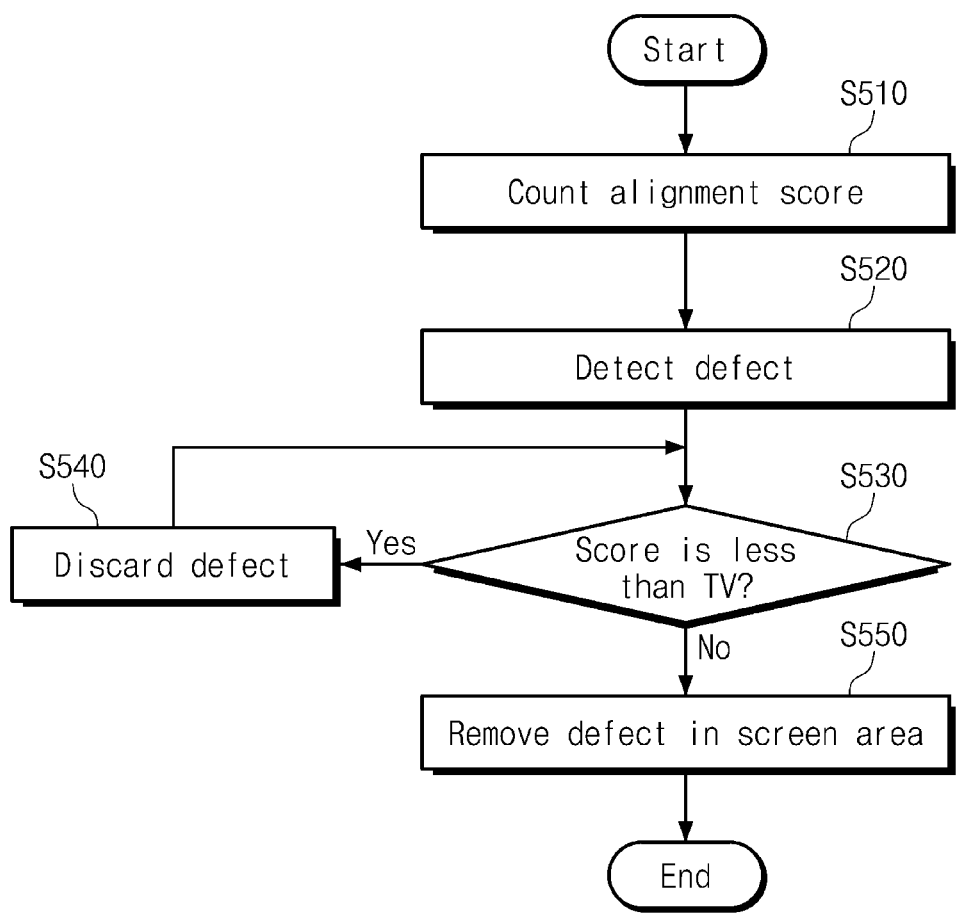
FIG. 9 illustrates an example of a method in which a defect detection unit filters a false defect.

FIG. 9 illustrates an example of a method in which the defect detection unit 414 filters a false defect. Referring to FIGS. 5 and 9, in operation S510, the defect detection unit 414 of the defect detector 410 in the defect detection module 400 may count or calculate an alignment score. For example, the defect detection unit 414 may count or calculate an alignment score of the contour image COI and the third layout image LI3. In operation S520, the defect detection unit 414 may detect a defect(s).

In operation S530, the defect detection unit 414 may determine whether the alignment score is smaller than a third threshold value (e.g., equal to or different from the first threshold value and/or the second threshold value). When it is determined that the alignment score is smaller than the third threshold value, in operation S540, the defect detection unit 414 may determine that the detected defect(s) is a false defect or a fake defect detected by the misalignment and may discard the defect(s).

When it is determined in operation S530 that the alignment score is not smaller than the third threshold value (TV) (i.e., is equal to or greater than the third threshold value), the defect detection unit 414 may remove a defect(s) in a screen region of the contour image COI from the defect(s). For example, the screen region of the contour image COI may refer to a region that is designated by the user so as not to detect a defect.

In an embodiment, operation S520 may be performed after operation S530. For example, in the case where the alignment score is smaller than the third threshold value, the defect detection unit 414 may terminate the defect detection operation without detecting a defect. In the case where the alignment score is not smaller than the third threshold value, the defect detection unit 414 may detect a defect.

Figure 10:
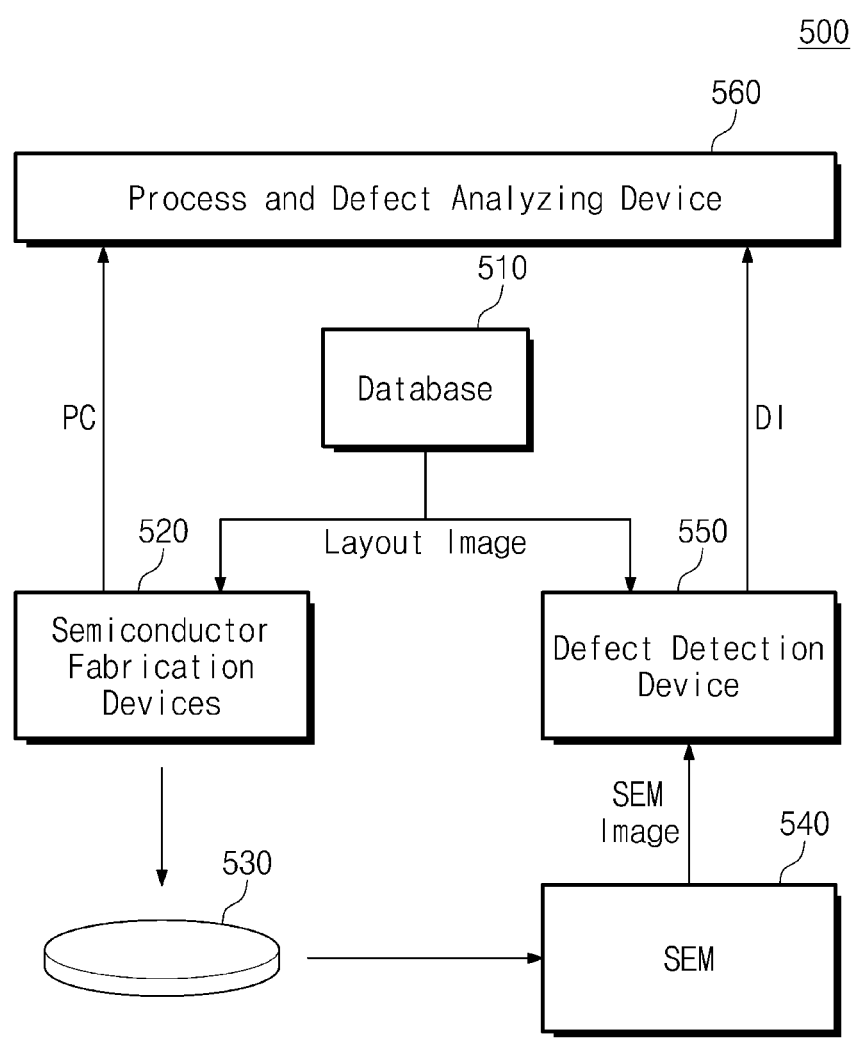
FIG. 10 illustrates a semiconductor fabricating system according to an embodiment of the present disclosure.

FIG. 10 illustrates a semiconductor fabricating system 500 according to an embodiment of the present disclosure. Referring to FIG. 10, the semiconductor fabricating system 500 may include a database 510, semiconductor fabrication devices 520, a semiconductor integrated circuit 530 (e.g., disposed on a semiconductor wafer), a scanning electron microscope (SEM) 540, a defect detection device 550, and a process and defect analyzing device 560.

The database 510 may store a layout image for fabrication of the semiconductor integrated circuit 530, for example, a CAD image or a graphic design system (GDS) image. The database 510 may provide the layout image to the semiconductor fabrication devices 520 and the defect detection device 550.

The semiconductor fabrication devices 520 may include various devices for fabrication of the semiconductor integrated circuit 530. For example, the semiconductor fabrication devices 520 may include various devices for exposure, etching, deposition, cleaning, and baking. The semiconductor fabrication devices 520 may fabricate the semiconductor integrated circuit 530 based on the layout image.

The SEM 540 may photograph a SEM image of the semiconductor integrated circuit 530. The SEM 540 may provide the SEM image to the defect detection device 550.

The defect detection device 550 may receive the layout image from the database 510 and may receive the SEM image from the SEM 540. The defect detection device 550 may detect a defect(s) of the semiconductor integrated circuit 530 based on the layout image and the SEM image. For example, the defect detection device 550 may include the defect detection module 400 described with reference to FIGS. 4 to 9. The defect detection device 550 may detect a defect(s) of the semiconductor integrated circuit 530 by using the defect detection module 400. The defect detection device 550 may provide defect information DI about the detected defect(s) to the process and defect analyzing device 560.

The process and defect analyzing device 560 may analyze a correlation between a kind of defect(s) and process variations of the semiconductor fabrication devices 520. The process and defect analyzing device 560 may change a process variation analyzed as a cause of the defect from among the process variations. For example, the process variations may include the amount of gas and/or a radio frequency (RF) power in the etching and/or deposition process, an exposure amount in the photo and/or spinner process, a photoresist thickness, and/or a bake temperature. The process and defect analyzing device 560 may suppress the occurrence of a defect(s) by changing a process variation(s) of the semiconductor fabricating devices 520 through a process control (PC) based on an analysis result.

In an embodiment, the database 510, the defect detection device 550, and/or the process and defect analyzing device 560 may be implemented in one computing device. Alternatively, the database 510, the defect detection device 550, and/or the process and defect analyzing device 560 may be implemented in two or more computing devices.

Figure 11:
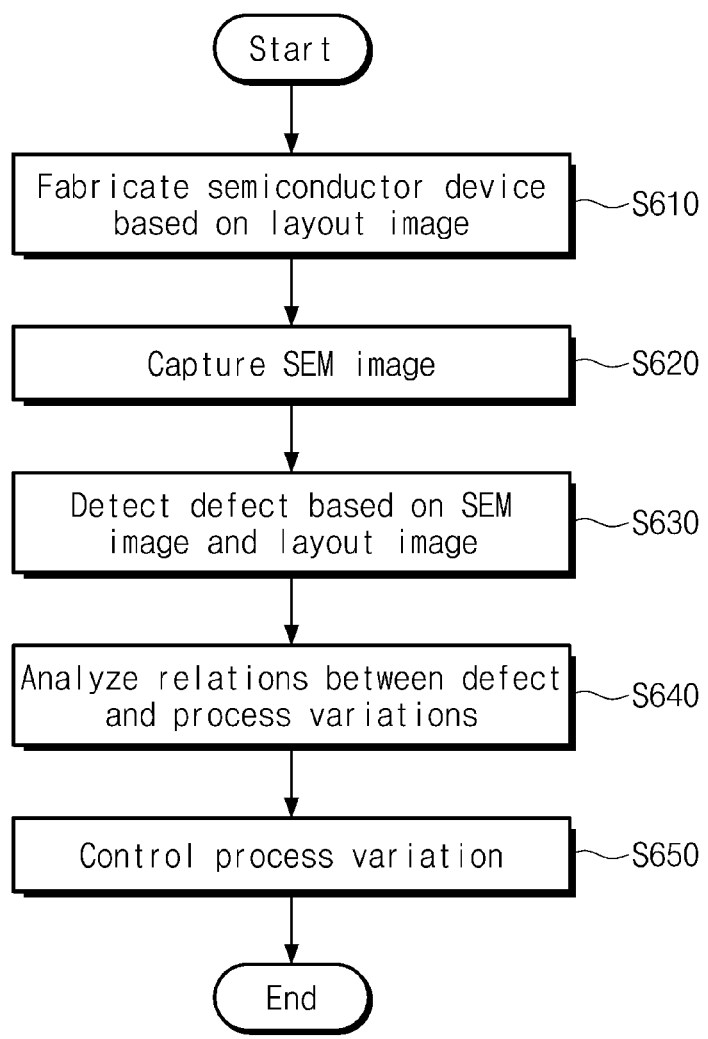
FIG. 11 illustrates an example of an operating method of a semiconductor fabricating system of FIG. 10.

FIG. 11 illustrates an example of an operating method of the semiconductor fabricating system 500 of FIG. 10. Referring to FIGS. 10 and 11, in operation S610, the semiconductor fabrication devices 520 may fabricate the semiconductor integrated circuit 530 based on a layout image provided from the database 510.

In operation S620, the SEM 540 may photograph a SEM image of the semiconductor integrated circuit 530. In operation S630, the defect detection device 550 may detect a defect(s) of the semiconductor integrated circuit 530 based on the layout image provided from the database 510 and the SEM image provided from the SEM 540.

In operation S640, the process and defect analyzing device 560 may analyze a correlation between a defect(s) and a process variation(s), based on the defect information DI. In operation S650, the process and defect analyzing device 560 may control a process variation(s) based on an analysis result.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, a defect detection module may generate a layout image from a captured image of a semiconductor integrated circuit based on machine learning and may detect defect locations by using the generated layout image. Accordingly, an electronic device including a processor executing a defect detection module detecting a defect of a semiconductor integrated circuit within a shortened time and with improved accuracy, and an operating method of the electronic device are provided.

As discussed above, the disclosed modules may be implemented by processors or similar, they may be programmed using software (e.g., code) to perform various functions discussed herein and may optionally be driven by firmware and/or software. Alternatively, each module may be implemented by dedicated hardware, or as a combination of dedicated hardware to perform some functions and a processor (e.g., one or more programmed microprocessors and associated circuitry) to perform other functions.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A semiconductor integrated circuit fabricating method of a semiconductor fabricating device which includes a processor executing a defect detection module, the method comprising:
   receiving, at the defect detection module, a first capture image of the semiconductor integrated circuit and a first layout image;
   generating, at the defect detection module, a second layout image from the first capture image;
   generating, at the defect detection module, a contour image from the first capture image and the second layout image;
   detecting, at the defect detection module, a defect of the semiconductor integrated circuit based on the first layout image and the contour image;
   analyzing, at the semiconductor fabricating device, a correlation between a kind of the defect and process variations of the semiconductor integrated circuit; and
   changing, at the semiconductor fabricating device, at least one process variation having a correlation with the defect from among the process variations.

2. The method of claim 1, wherein the first capture image is an image captured from a semiconductor integrated circuit fabricated based on the first layout image, and the first capture image includes a defect in the semiconductor integrated circuit.

3. The method of claim 1, further comprising:
   receiving, at the defect detection module, a second capture image of the semiconductor integrated circuit; and
   generating, at the defect detection module, a third layout image from the second capture image,
   wherein the detecting of the defect is performed based on the first layout image, the contour image, and the third layout image.

4. The method of claim 3, wherein the second capture image is an image captured from a semiconductor integrated circuit fabricated without a defect based on the first layout image.

5. The method of claim 3, further comprising:
   comparing the third layout image and the first layout image to detect an alignment parameter, wherein the detecting of the defect is performed based on the first layout image, the contour image, and the alignment parameter.

6. The method of claim 5, wherein the detecting of the alignment parameter includes:
   comparing the third layout image and the first layout image; and
   detecting a difference between a location of a center of the third layout image and a location of a center of the first layout image as the alignment parameter, in response to that the third layout image is aligned with the first layout image.

7. The method of claim 6, wherein the detecting of the alignment parameter includes:
   in response to determining that the third layout image is not aligned with the first layout image, down-sampling the third layout image and comparing the down-sampled third layout image and the first layout image.

8. The method of claim 7, wherein the comparing of the down-sampled third layout image and the first layout image includes:
   selecting a fourth layout image, which includes the first layout image and is wider in region than the first layout image, from an original layout of the layout image; and
   comparing the down-sampled third layout image and the fourth layout image.

9. The method of claim 5, wherein the detecting of the defect includes:
   shifting the contour image as much as the alignment parameter so as to be aligned with the first layout image; and
   detecting a difference between the aligned contour image and the first layout image as the defect.

10. The method of claim 1, further comprising:
    calculating an alignment score between the first layout image and the contour image; and
    when the alignment score is smaller than a threshold value, discarding the detected defect.

11. The method of claim 1, further comprising:
    removing a defect in a screen region of the contour image and/or the first layout image.

12. The method of claim 1, wherein the generating of the second layout image from the first capture image is based on a generative adversarial network (GAN).

13. The method of claim 1, wherein the process variations include the amount of gas and/or a radio frequency (RF) power in an etching and/or deposition process, an exposure amount in a photo and/or spinner process, a photoresist thickness, and a bake temperature.

14. An electronic device comprising:
    a memory configured to store a first capture image and a second capture image of a semiconductor integrated circuit; and
    a processor configured to execute a defect detection module,
    wherein the defect detection module, when executed by the processor, is configured to:
    receive the first capture image and a first layout image;
    generate a second layout image from the first capture image;
    generate a contour image from the first capture image and the second layout image; and
    detect a defect based on the first layout image and the contour image, and
    wherein the first capture image is an image captured from a semiconductor integrated circuit fabricated based on the first layout image, and the first capture image includes a defect in the semiconductor integrated circuit.

15. The electronic device of claim 14, wherein the defect detection module, when executed by the processor, is further configured to:
    receive the second capture image;
    generate a third layout image from the second capture image; and
    detect the defect based on the first layout image, the contour image, and the third layout image, and
    wherein the second capture image is an image captured from a semiconductor integrated circuit fabricated without a defect based on the first layout image.

16. The electronic device of claim 15, wherein the defect detection module, when executed by the processor, is further configured to:
    compare the third layout image and the first layout image to detect an alignment parameter; and
    detect the defect based on the first layout image, the contour image, and the alignment parameter.

17. The electronic device of claim 16, wherein the defect detection module, when executed by the processor, is further configured to:
    compare the third layout image and the first layout image; and
    detect a difference between a location of a center of the third layout image and a location of a center of the first layout image as the alignment parameter, in response to that the third layout image is aligned with the first layout image.

18. The electronic device of claim 17, wherein the defect detection module, when executed by the processor, is further configured to:
    in response to determining that the third layout image is not aligned with the first layout image, down-sample the third layout image and compare the down-sampled third layout image and the first layout image.

19. The electronic device of claim 18, wherein the defect detection module, when executed by the processor, is further configured to:
    select a fourth layout image, which includes the first layout image and is wider in region than the first layout image, from an original layout of the first layout image; and
    compare the down-sampled third layout image and the fourth layout image.

20. An operating method of an electronic device which includes a processor executing a defect detection module, the method comprising:
    receiving, at the defect detection module, a first capture image of a semiconductor integrated circuit, a second capture image, and a first layout image;
    generating, at the defect detection module, a second layout image and a third layout image from the first capture image and the second capture image, respectively;
    comparing, at the defect detection module, the second layout image and the first layout image to detect an alignment parameter;
    generating, at the defect detection module, a contour image from the second capture image and the third layout image;
    aligning, at the defect detection module, the contour image with the first layout image based on the alignment parameter; and detecting, at the defect detection module, a difference between the contour image and the first layout image as a defect.

\* \* \* \* \*